US009221481B2

(12) United States Patent
Desbordes et al.

(10) Patent No.: US 9,221,481 B2
(45) Date of Patent: Dec. 29, 2015

(54) DEVICE FOR MEASURING SPEED AND POSITION OF A VEHICLE MOVING ALONG A GUIDANCE TRACK, METHOD AND COMPUTER PROGRAM PRODUCT CORRESPONDING THERETO

(75) Inventors: Jean-Luc Desbordes, Rennes (FR); Nicolas Chatel, Cesson Sevigne (FR)

(73) Assignees: J.M.R. PHI, Betton (FR); Jean-Luc Desbordes, Rennes (FR)

( * ) Notice: Subject to any disclaimer, the term of this patent is extended or adjusted under 35 U.S.C. 154(b) by 90 days.

(21) Appl. No.: 14/123,922

(22) PCT Filed: Jun. 8, 2012

(86) PCT No.: PCT/EP2012/060880
§ 371 (c)(1),
(2), (4) Date: Feb. 27, 2014

(87) PCT Pub. No.: WO2012/168424
PCT Pub. Date: Dec. 13, 2012

(65) Prior Publication Data
US 2015/0008294 A1    Jan. 8, 2015

(30) Foreign Application Priority Data
Jun. 9, 2011   (FR) .................................. 11 55053

(51) Int. Cl.
*B61L 25/02*   (2006.01)
*G01C 22/00*   (2006.01)
(Continued)

(52) U.S. Cl.
CPC ............. *B61L 25/021* (2013.01); *B61L 25/025* (2013.01); *B61L 25/026* (2013.01); *G01C 22/00* (2013.01);
(Continued)

(58) Field of Classification Search
CPC .... B61L 25/021; B61L 25/026; B61L 25/025; B60L 2200/26; G01C 22/00; G01C 23/00; G06T 7/20; G06T 2207/1004; G06T 2207/30236; G01P 3/36; G06K 9/00791
USPC .......................................................... 701/523
See application file for complete search history.

(56) References Cited

U.S. PATENT DOCUMENTS 7,764,808 B2    7/2010  Zhu et al.
8,233,660 B2 *  7/2012  Fritsch et al. .................. 382/103
(Continued)

FOREIGN PATENT DOCUMENTS

CN        101842661 A    9/2010
DE        19746970 A1    4/1999
(Continued)

OTHER PUBLICATIONS

French Search Report and Written Opinion dated Feb. 22, 2012 for corresponding French Patent Application No. 1155053, filed Jun. 9, 2011, 6 pages.

(Continued)

*Primary Examiner* — Richard Camby
(74) *Attorney, Agent, or Firm* — David D. Brush; Westman, Champlin & Koehler, P.A.

(57) ABSTRACT

A device is provided for measuring speed and/or position of a vehicle moving along a guidance track, by day and by night, and doing so whatever the climatic conditions. Such a device includes at least one image capture apparatus delivering a sequence of digital images of an environment of the vehicle; an apparatus that determines the apparent motion of at least one visual index, called a primitive, between two images delivered by the image capture apparatus, so as to determine the apparent motion of said at least one visual index; and an apparatus that estimates speed and/or the position of the vehicle on the basis of the apparent motion of the at least one visual index.

19 Claims, 9 Drawing Sheets

(51) Int. Cl.
 *G01C 23/00* (2006.01)
 *G01P 3/36* (2006.01)
 *G06T 7/20* (2006.01)
 *G06K 9/00* (2006.01)
(52) U.S. Cl.
 CPC . *G01C 23/00* (2013.01); *G01P 3/36* (2013.01); *G06K 9/00791* (2013.01); *G06T 7/20* (2013.01); *G06T 7/2033* (2013.01); *B60L 2200/26* (2013.01); *G06T 2207/10004* (2013.01); *G06T 2207/30236* (2013.01); *G06T 2207/30252* (2013.01)

(56) References Cited

U.S. PATENT DOCUMENTS

| | | | |
|---|---|---|---|
| 2004/0080450 A1* | 4/2004 | Cheong | 342/118 |
| 2004/0183905 A1* | 9/2004 | Comaniciu et al. | 348/148 |
| 2004/0221790 A1 | 11/2004 | Sinclair et al. | |
| 2007/0282563 A1 | 12/2007 | Banks et al. | |
| 2010/0296705 A1 | 11/2010 | Miksa et al. | |

FOREIGN PATENT DOCUMENTS

| | | |
|---|---|---|
| DE | 102005029956 A1 | 2/2006 |
| EP | 1606769 A2 | 12/2005 |
| FR | 2673901 B1 | 5/1994 |
| JP | 2009205642 A | 9/2009 |
| WO | 02058984 A1 | 8/2002 |
| WO | 2004028881 A1 | 4/2004 |
| WO | 2005120924 A1 | 12/2005 |
| WO | 2007091072 A1 | 8/2007 |
| WO | 2010083946 A1 | 7/2010 |

OTHER PUBLICATIONS

Third Party Observation dated Feb. 25, 2013 for corresponding International Patent Application No. PCT/EP2012/060880, filed Jun. 8, 2012, 4 pages.
Third Party Observation dated May 13, 2013 for corresponding International Patent Application No. PCT/EP2012/060880, filed Jun. 8, 2012, 4 pages.
Applicant Comments on Third Party Observations dated Sep. 16, 2013 for corresponding International Patent Application No. PCT/EP2012/060880, filed Jun. 8, 2012, 21 pages.
International Search Report dated Oct. 30, 2012 for corresponding International Patent Application No. PCT/EP2012/060880, filed Jun. 8, 2012, 4 pages.
International Preliminary Report on Patentability and Written Opinion dated Dec. 10, 2013 for corresponding International Patent Application No. PCT/EP2012/060880, filed Jun. 8, 2012, 8 pages.
Kruse et al., "Multi-Sensor System for Obstacle Detection in train Applications" Sep. 3, 2002 (Mar. 9, 2012).
Giachetti et al., "The Use of Optical Flow for Road" IEEE Transactions on Robotics and Automation, vol. 14., No. 4, Feb. 1998.
M.A. Sotelo et al., "Vision-Based Ego-Motion Computing for Intelligent Vehicles" Lecture Series on Computer and Computational Sciences, vol. 1, 2006, pp. 1-4.
Shenton, "Train Video Positioning" Conference Sep. 26, 2008.
A.G. Rad et al., "Vehicle Speed Detection in Video Image Sequence Using CVS Method Navigation" International Journal of the Physical Sciences vol. 5(17), pp. 2555-2563, Dec. 18, 2010.
Shenton, "Video Train Positioning" The Institution of Railway Signal Engineers Inc., IRSE Australia Technical Meeting, Sydney, Mar. 18, 2011.

* cited by examiner

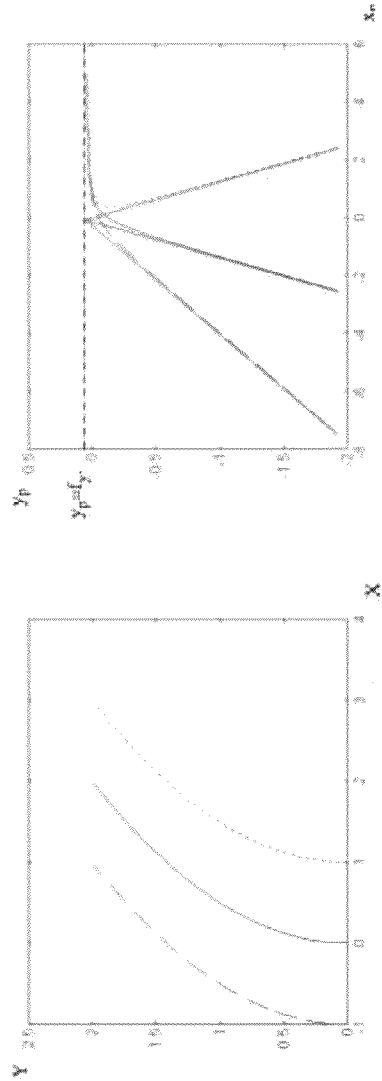
Figure 10A
Figure 10B
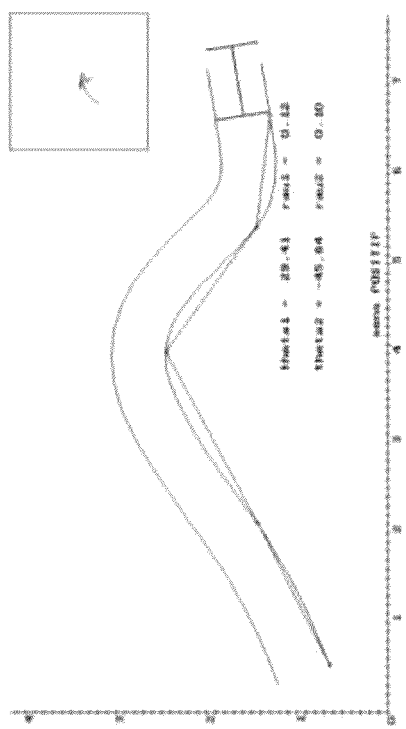
Figure 10C

DEVICE FOR MEASURING SPEED AND POSITION OF A VEHICLE MOVING ALONG A GUIDANCE TRACK, METHOD AND COMPUTER PROGRAM PRODUCT CORRESPONDING THERETO

1. CROSS-REFERENCE TO RELATED APPLICATIONS

This application is a Section 371 National Stage application of International Application No. PCT/EP2012/060880, filed Jun. 8, 2012, which is incorporated by reference in its entirety and published as WO 2012/168424 on Dec. 13, 2012, not in English.

2. FIELD OF THE INVENTION

The present invention relates to a method for locating and/or measuring the speed of a vehicle moving along a guideway for example a railway track comprised of two rails and a device equipping such a vehicle, especially a locomotive.

3. PRIOR-ART TECHNIQUES

The development of current systems for monitoring and managing railway traffic must meet the requirements of the European Rail Traffic Management System (ERTMS) which seeks to harmonize the signaling and control of speeds for railway transport in Europe and therefore to make the circulation of trains more reliable.

To improve the conditions of circulation of trains in a railway network as well as the safety of all traffic, precise knowledge is needed of the speed and location (position) of each train in the railway network.

To meet this need, trains are equipped with a combination of odometry sensors of different types such as accelerometers, Doppler radars and wheel sensors. This solution is costly and requires the application of complex algorithms to process the signals measured. These sensors take measurements, accuracy of which nevertheless is not satisfactory especially due to their sensitivity to weather conditions, low speeds, vibrations, configuration of the train and of the ground, slippage of train wheels on the rails. Furthermore, the measurements obtained from such odometry sensors are prone to drifts. Besides, some of these sensors are fixed underneath the vehicle, and are subject to damage (flying rocks for example).

To overcome these drifts and improve the accuracy of measurements of the position of the trains, it has been proposed to "readjust" the measurements of position obtained from odometry sensors with ground systems, as emitters/beacons (called "Eurobalises") which are fixed at regular intervals (every 1.5 km on average in Belgium, for example) on the track. Such a beacon is activated when the train passes and sends to this train its exact location relative to an absolute reference frame tied to the track. The embedded calculator of the train then corrects the train position error by readjusting the odometry position with that of the last beacon encountered.

One drawback of this approach is that beacons are placed on the track between the rails. Without surveillance, they are thus vulnerable to vandalism. They are also subject to relatively high mechanical stresses at the passing of a train, possibly causing malfunctions. Apart from the cost incurred to maintain these beacons, it is also a cost associated with the installation of these beacons on the entire railway network and with the management of stocks. In addition, this solution raises a problem of security since, if a beacon were no longer in operation, the interval between two readjustments of position measurements from the odometry sensors would be increased.

In one alternative, it has been proposed to equip the train with a GPS receiver to make the measurements by such odometry sensors more reliable. However, for this purpose, the GPS receiver should be capable of continuously picking up signals from satellites to allow the location of the train, which is made difficult in tunnels, urban corridors and very steep mountain valleys.

Another solution based on an optical system, marketed under the name Correvit®, is to equip the train with sensors being based on LED technology. However, one drawback of this approach is that these sensors are relatively fragile and vulnerable to environmental conditions, being mounted underneath the vehicle, in proximity to the railway rail.

Yet another solution for measuring the "distance travelled" of a train is described in the patent document FR 2 673 901. This approach implements magnetizable tracks fixed all along the track and at least one coil for magnetically marking such tracks, powered by an electrical current pulse generator and situated on the front bogie of the locomotive, and at least one detector of this magnetic marking situated on the rear bogie of the locomotive. These elements are implemented relative to the sense of movement of the vehicle, the coil and the detector being spaced by a predetermined distance one to the other. This approach also provides means for commanding a new marking after each detection, and means for counting the number of detected markings representative of the distance travelled by the locomotive (and therefore the position of the locomotive on the track).

However, one drawback of this approach is that the means are expensive to implement and maintain in operation since subjected to high mechanical stresses.

There are also known ways of implementing an image capture device placed at one end of the train, the images being subsequently analyzed to determine the speed and the position of the train. The images analysis consists in finding elements, such as for example barcodes placed on the ground along the railway track, at locations known beforehand, and in comparing the detected codes with codes stored in a database for locating the train spatially.

One drawback of this approach is that it requires barcodes to be placed on the entire rail network, which is costly to implement.

Another drawback of this approach is that it requires the management of a database. Furthermore, the image analysis and the comparison with data stored in the database require significant processing time.

In other words, current solutions for measuring the position and speed of trains are not fully satisfactory.

Indeed, they require the implementation of detection equipment that is:
- based on different technologies and that measures quantities of different types, which require the implementation of complex processing algorithms of the measured signals, and generate relatively long data processing times;
- embedded (underneath or inside the locomotive) or placed on the ground (between the rails or along the track), which makes this equipment subject to damages;
- expensive (especially for its maintenance), imprecise (especially for low speeds of the train) and subject to drifts.

4. SUMMARY OF THE INVENTION

An aspect of the present disclosure relates to a device for measuring the speed and/or position of a vehicle moving along a guideway, by day and by night, in doing so irrespective of the climatic conditions.

According to the invention, such a device comprises:
at least one image capturing apparatus delivering a sequence of digital images of an environment of said vehicle;
means for determining the apparent motion of at least one visual cue, called a primitive, between two images delivered by said image capturing apparatus, in order to determine the apparent motion of said at least one visual cue, implementing:
means for simplifying said images by means of at least one model of said environment, enabling the detection of said at least one visual cue in the simplified images;
means for predicting an image zone in which said visual cue will be situated in a following image;
means for extracting one of said visual cues in said image zone;
means for estimating a movement, by comparing the actual position of said visual cue in a current image and in a previous image;
means for estimating the speed and/or the position of said vehicle on the basis of said apparent motion of said at least one visual cue.

The device of the invention allows to measure the speed and position of a vehicle, such as a train, moving along a guideway (running on a railway track, for example) by determining the motion in a succession of images delivered by an image capturing apparatus which especially, in one embodiment, can be an optical imaging sensor in the form of a camera.

The device of the invention implements a processing of images coming from a same sequence taken in a structured environment. From the image, in real time or almost in real time, it extracts the relevant primitives of the projection (visual scene) of the railway environment, consisting of the guideway and close objects, carries out the tracking and the scrolling motion calculation in the image of these primitives. The computation of the speed and of the "distance travelled" of the vehicle is finally made possible by a priori knowledge of some real quantities of the railway environment (real scene), the model of the environment possibly, for example, being a simplified dynamic model.

Depending on the case, said at least one image capturing apparatus belongs to the group including especially (in a non-exhaustive list):
view taking apparatuses;
thermal cameras;
magnetic cameras, etc.

The invention thus makes it possible to measure the speed and "distance travelled" (or the relative position) of a train by internal reference in a partially known a priori railway environment, from one or more image capturing apparatus (or imaging sensors) adapted, for example, to the visible spectrum (view taking apparatus), the infrared spectrum (thermal sensor) and/or to magnetic radiation (magnetic camera).

It must be noted that the image capturing apparatus or apparatuses implemented in the device of the invention provide, by day and by night, and regardless of the weather conditions, a sequence of images (video, thermal, magnetic or other), from which the computation of the vehicle speed and of the "distance travelled" by this vehicle can be performed according to the principle of the invention.

In other words, the image capturing apparatus is a device for capturing the structuring elements of the environment in which the vehicle is moving (by optical, thermal, acoustic, magnetic or other types of imaging).

Besides, the images that are delivered by the image capturing apparatus or apparatuses, and are processed by the device of the invention, may be images of the scene situated in the front or in the rear of the vehicle.

In one particular implementation, said at least one visual cue is representative of at least one geometrical characteristic of said guideway, such as the radius of curvature, the railroad track gauge, the alignment.

Advantageously, said at least one visual cue is representative of at least one geometrical characteristic of at least one object situated along the guideway, such as the verticality of the poles.

Thus, the invention uses visual cues or characteristics, called primitives, which are objects extracted from the image containing, in a concise way, an important information for the analysis of this image (in general these visual cues are contours or regions of the image), and the evolution in time and in space of which is governed by the properties of some carefully chosen real quantities of the railway environment (the railroad track gauge, the curvature of the track, the verticality of the poles along the track, etc.) known to remain constant or to change slowly throughout a same sequence of images.

Provision is thus made for zones for detecting the railway track and the objects along it.

The primitives, extracted from the images, are directly used by the invention, thus also making it possible to totally remove the need for the phase of interpretation of visual information which is costly in computation time for complex scenes.

In other words, the fact of using the primitives directly in the image considerably reduces the volume of data to be processed and the time of execution of the algorithms in the motion estimation process.

In one embodiment of the invention, the device implements a model of said vehicle and a model of said image capturing apparatus.

The combination of the models of the vehicle and of the image capturing apparatus, the model of the environment, the dynamic elements of the guideway-vehicle set, such as data related to the task to be executed (moving on the guideway in this case), are integrated, in the form of parameters and algorithms, into the computation unit of the device of the invention, which receives, in operation, information on the current state of the vehicle (proprioceptive information) and information on the current state of the environment (exteroceptive information).

The models of the vehicle and of the image capturing apparatus are combined in the process for determining internal parameters of the image capturing apparatus (auto-calibration) mounted on the vehicle moving on the guideway. The model of the environment (the guideway and objects along the track) occurs during the phase for extracting visual cues from the image (the phase for simplifying the image). The dynamic elements of the guideway-vehicle set take part in the estimation of the speed and "distance travelled" of the vehicle moving on the guideway.

All these modeling elements are directly involved in expressing the relationship between the visual information changes in the image and the motions in real space of the image capturing apparatus mounted on the vehicle moving on the guideway (interaction matrix).

In one particular mode of implementation, the means for tracking and prediction implement a Kalman filter.

The constraint of permanently having a reliable and available measurement of the speed and of the "distance travelled"

of the moving train requires the use of a system for tracking and prediction, by Kalman filtering for example, of a set of notions extracted from the image, such as areas of interest, which materialize the relevant vertical primitives, and some geometrical characteristics of the railway (radius of curvature, track gauge, alignment), the behavior of which is known a priori through models, and the previous estimation of which is still in memory (i.e. stored in a storage memory of the device).

The device of the invention therefore emphasizes models that are simple but very fast in terms of execution and compensates modeling errors through a system of tracking and prediction in the image by Kalman filtering.

A Kalman filter enables to track and predict a set of notions extracted from the image based on the contours of objects.

Classically, the Kalman filter has two distinct phases, namely a prediction phase and an updating phase. The prediction phase uses the state estimated at the previous time to produce an estimate of the current state. In the updating phase, the observations at the current time are used to correct the predicted state in order to obtain a more accurate estimate.

The invention is advantageous in that it does not require converting the images delivered by the camera (there is a gain in time). Some characteristics of the railway track and of the vehicle are sufficiently stable to be used as pre-requisites in the estimate of speed and position.

The device of the invention takes place in the safety context by improving the accuracy and reliability of the measurements of speed and position, and by the fast execution of simple and robust algorithms related, not to specific models that are difficult to obtain from the manufacturers, but to models, the parameters of which are generic and stable.

The invention does not require that supplementary equipment should be added on along the railway track to estimate the speed and position of the train. It uses the existing infrastructure which is sufficiently intensive in relevant information. It does not use any database of railway network map, which allows it to be independently functional on all railway networks worldwide.

In one embodiment of the invention, the device comprises a tilt sensor adapted to generate a signal representing the inclination of the image capturing apparatus and means for rotating an image delivered by said image capturing apparatus at an angle that depends on the signal generated.

Advantageously, said tilt sensor implements a Deriche filter.

The implementation of a camera used as an optical sensor for measuring the speed and position of a train requires stabilizing the images delivered by the camera.

Indeed, when the train moves, it undergoes elevations that bring the embedded camera to capture a noisy scene, giving a so-called "flickering" image sequence. The techniques currently used for analyzing motion in a sequence of images are sensitive to external disturbances. Thus, when the actual trajectory of the visual sensor is noise-affected, this error of movement is irretrievably reflected on the 3D measurements of the environment. Finally, the detected movement consists of a movement relative to the train (global motion) which itself consists of the train's own movement (egomotion) and a movement called "noise" (pitch and roll).

The movement called noise can be reduced or directly eliminated by means of the electronics of the camera in case of low amplitudes but also by compensation through a mechanical device for supporting the camera in case of high amplitudes.

The own movement of the train is determined through image processing methods using the velocity fields related to the environment. The principle of these methods is to find, from a sequence of planar projections of the same environment, a consistency between the notion of scrolling in the image and that of the train's own movement (or egomotion).

In a certain preselected zone of the image, the study of movement is related to the detection of straight-line segments of preferred direction, vertical for example, and their speed.

One approach consists in using a filter for detecting vertical elements. On this basis, a modified Deriche filter is used to determine the angle of rotation of the camera around its axis of sight, called the angle of the greatest number of pixels in the image.

To be certain that a vertical element in the image truly corresponds to a vertical edge of an object in the scene, without knowing the angular position of the camera in a fixed absolute reference frame, the idea is to extract not vertical straight lines from the image but those the direction of which is the most represented in the image and assimilated to the direction of gravity. These lines are previously extracted in a preferred direction determined by a modified Deriche filter, which enables to calculate the angle of the greatest number of pixels in the image (i.e. the angle of the direction most represented in the image) in order to extract, from the image, the contours of a same direction as this angle and to provide, to the system of the invention, the notion of verticality and thus the notion of specific internal reference.

In the case where such a modified Deriche filter provides this information to a device for image derotation, a vertical element in the image obtained after derotation would then correspond to a vertical edge of an object of the real scene.

Such an approach thus makes it possible to recognize and locate the vertical elements or the pseudo-vertical elements in the image. Each of them is then located in the form of an area of interest that is rectangular and provides information on its length, position and error of verticality.

The device of the invention thus provides to the train a notion of balance, on the one hand by determining the angle of rotation of the image relative to its own system of reference, and on the other hand by almost naturally damping some external disturbances due to uneven terrain preventing, still nowadays, a computer vision equipment aboard a mobile vehicle from correctly analyzing the movement in natural environment.

Such a solution makes it possible not only to measure the temporal destabilization incurred by the camera during the movement of the train without implementing a tilt sensor, such as a gyroscope or an inclinometer, but also to distinguish a rotation in the scene from a rotation of the camera filming the scene.

In one alternative, such tilt sensors may however be integrated into the device of the invention in order to satisfy, for example, constraints of redundancy of information in a safety framework.

In other words, the images of the scene are acquired and stabilized in order to analyze the apparent motion. Image stabilization provides the notion of balance, lacking for odometry, in order that every vehicle in circulation has its own referential system linked to it.

Preferably, the device implements an interaction matrix linking the motions of the image capturing apparatus in the real space with the motions of said at least one cue in said images.

Advantageously, the device comprises means for calibrating said image capturing apparatus.

This allows for the dimensional relationship between the 3D and the 2D environments.

The principle of the invention is that of an adaptation to the railway industry of the visual servo control of mobile robots in a structured environment. To this end:
- the visual servo control is the job not only of the driver of the moving vehicle, the main role of which is to regulate the speed of the vehicle as displayed on the instrument panel, but also of the EVC (European Vital Computer, i.e. the onboard computer) which triggers an emergency stop when the driver behavior is considered dangerous and when the required level of safety is no longer reached;
- the controlled quantities are mainly the speed and acceleration of the moving vehicle, the direction of this vehicle being constrained by the curvature of the guideway;
- the images of the scene are acquired by a single camera and are stabilized in order to analyze the apparent motion;
- the stabilization of the images thus provides the notion of balance, lacking for odometry, in order that every vehicle in circulation has its own referential system linked to it.

According to one particular embodiment of the invention, the device comprises means for displaying digital images of said environment delivered by said image capturing apparatus.

Advantageously, said images are displayed on at least one LCD screen, on the windshield of said vehicle or on a transparent mirror situated before the windshield of said vehicle.

In one particular embodiment of the invention, the device comprises means for inputting a given route.

Advantageously, the device comprises means for storing at least one map of a transportation network.

Preferably, the device comprises means for indicating the geographic position of said vehicle.

The invention also relates to a method for measuring speed and/or position of a vehicle moving along a guideway, by day and by night, irrespective of the climatic conditions.

According to the invention, such a method comprises the following steps:
- obtaining a sequence of digital images of an environment of said vehicle by means of an image capturing apparatus;
- determining the apparent motion of at least one visual cue, called a primitive, between two images delivered by said image capturing apparatus in order to determine the apparent motion of said at least one visual cue, according to the following steps:
  - simplifying said images by means of at least one model of said environment, enabling the detection of said at least one visual cue in the simplified images;
  - predicting an image zone in which said visual cue will be situated in a next image;
  - extracting one of said visual cues in said image zone;
  - estimating a movement by comparing the actual position of said visual cue in a current image and a previous image;
- estimating speed and/or position of said vehicle from said apparent motion of said at least one visual cue.

Furthermore, the invention relates to a computer program product, downloadable from a communications network and/or stored on a computer-readable medium and/or executable by a microprocessor, which comprises program code instructions for the execution of the method described here above in the device described here above.

5. LIST OF FIGURES

Other features and advantages of the invention shall appear more clearly from the following description of a particular embodiment of the invention, given on a simple, illustrative and non-exhaustive basis, and from the appended drawings, of which:

Figure 4:
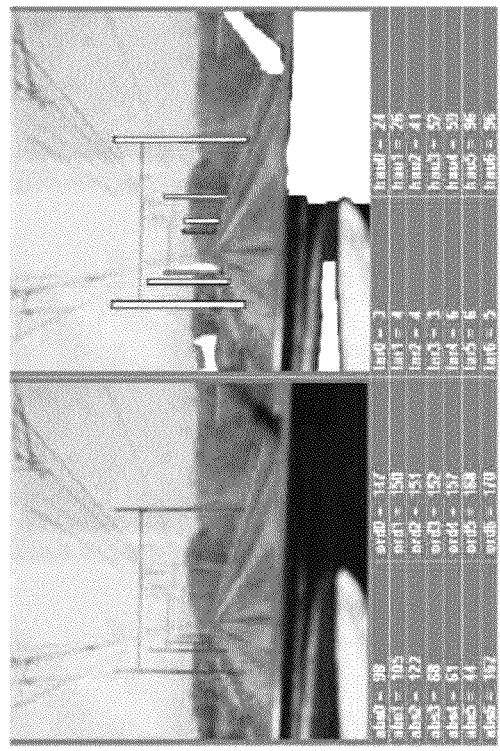
Figure 5:
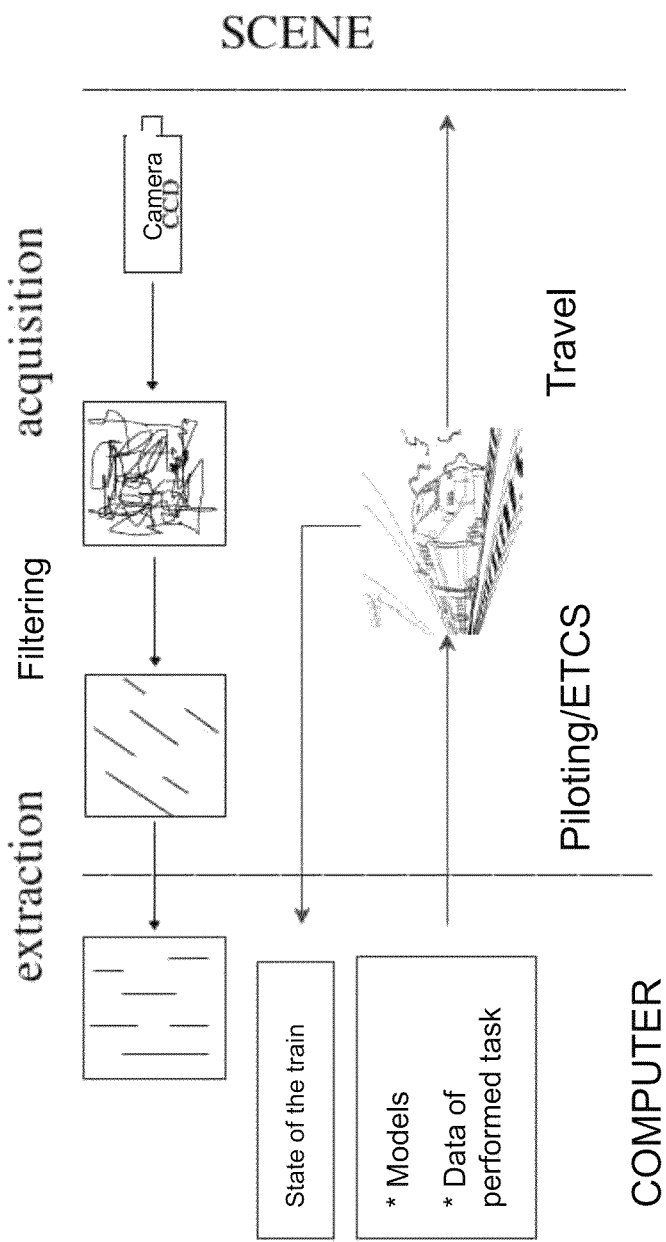
Figure 6:
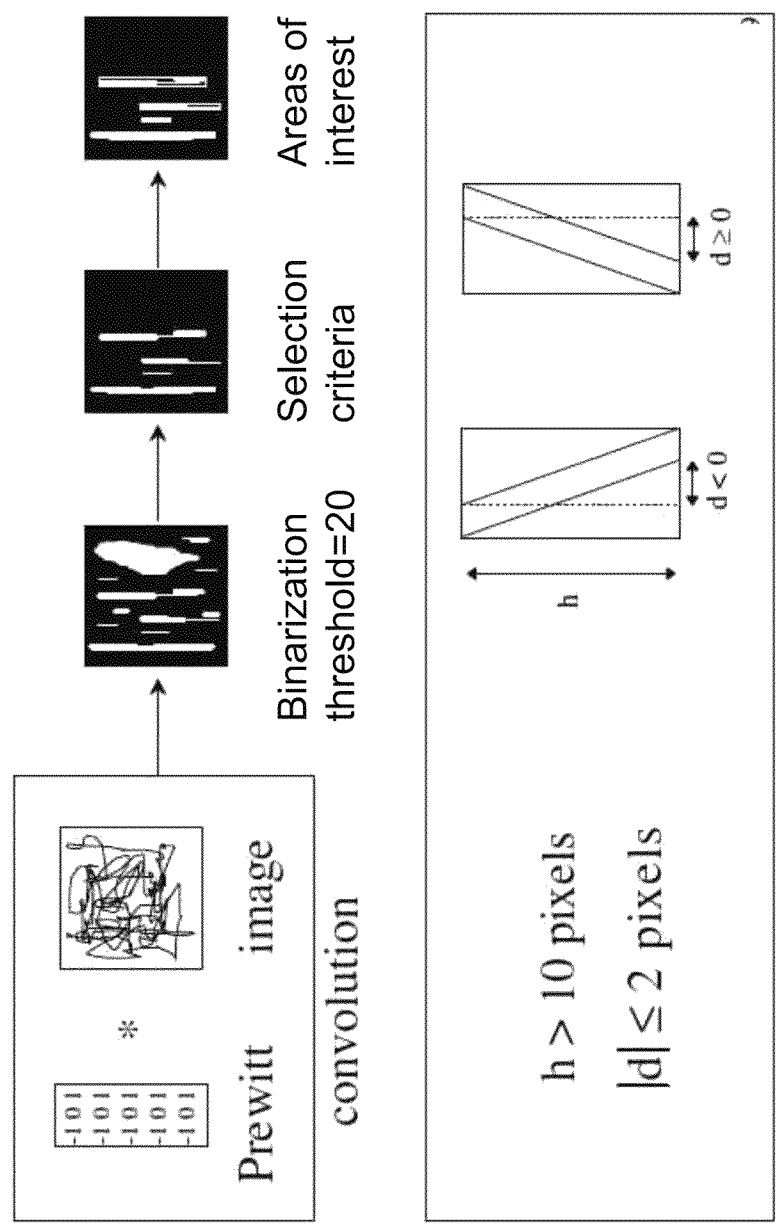
Figure 7:
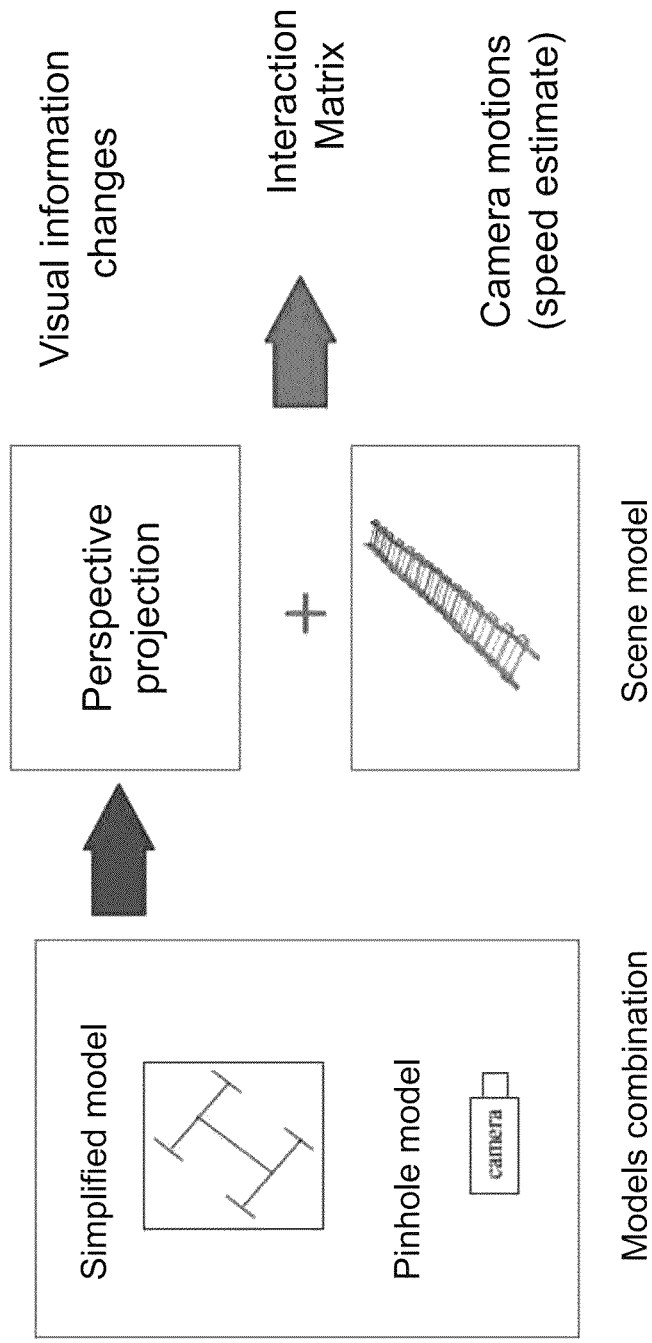
Figure 8B:
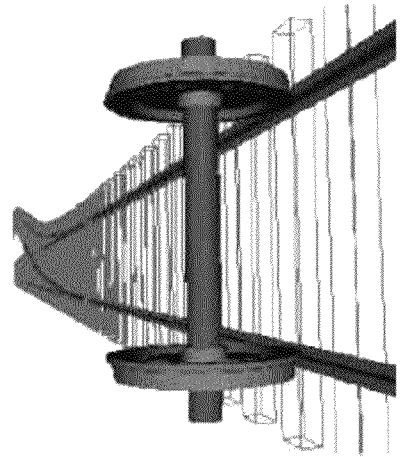
Figure 8E:
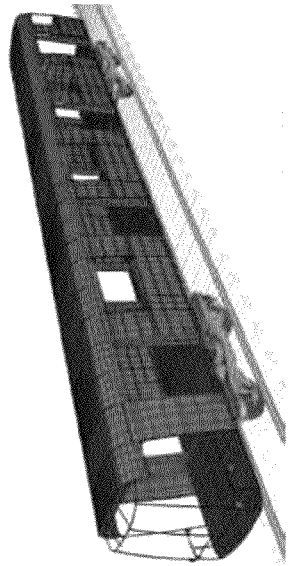
Figure 8D:
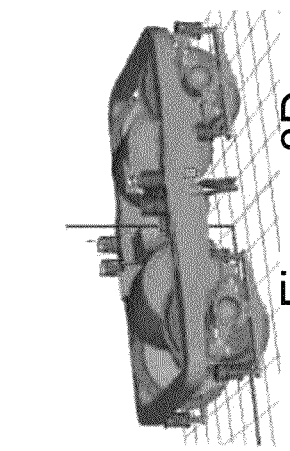
Figure 8A:
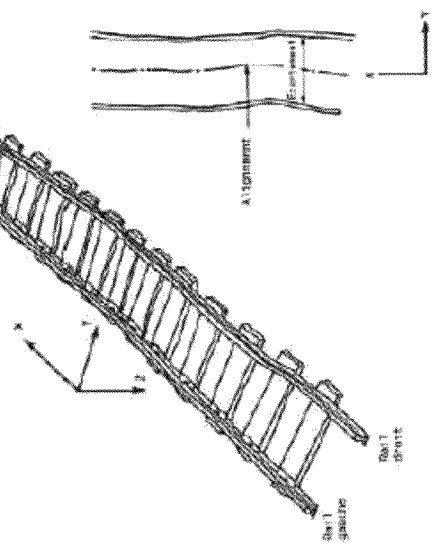
Figure 8C:
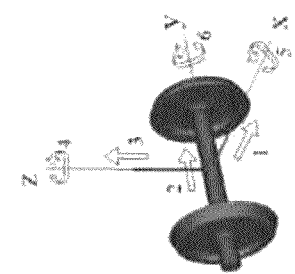
Figure 9C:
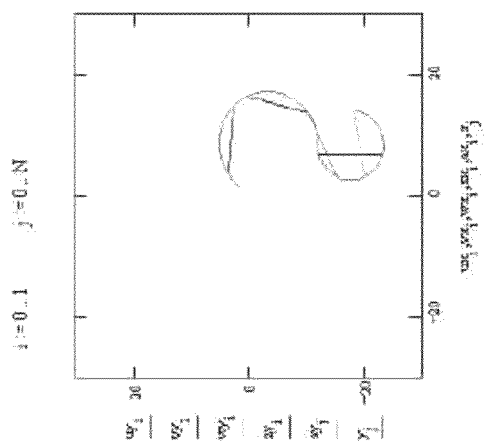
Figure 9A:
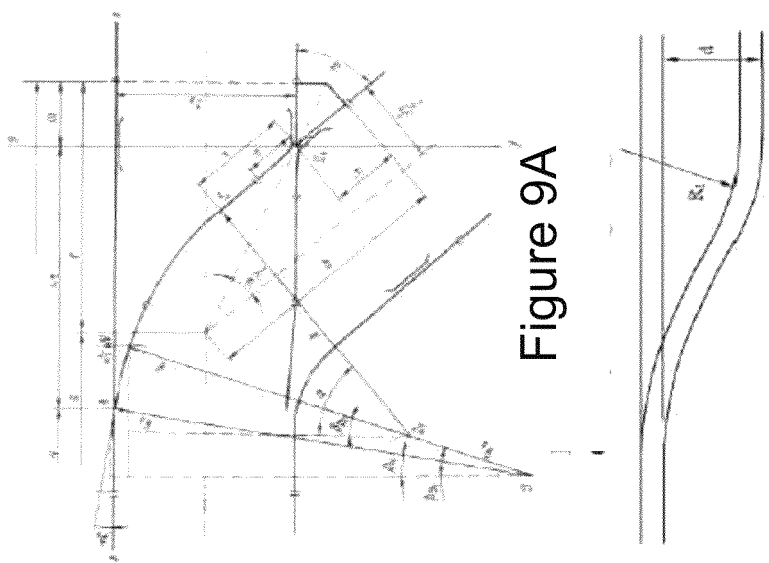
Figure 9B:
Figure 11B:
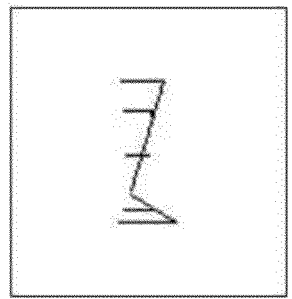
Figure 11C:
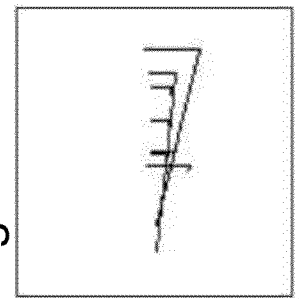
Figure 11A:
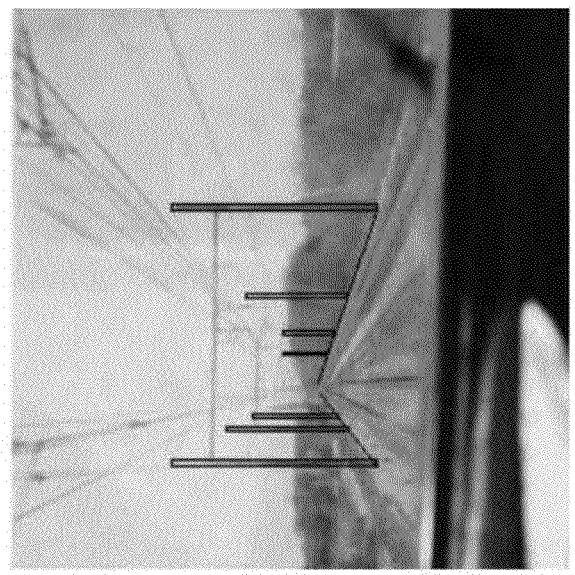

FIG. 4 presents an example of characterization of pseudo-vertical elements in an image, as implemented in the device of the invention;

FIG. 5 presents the general principle of measurement of the speed and "distance travelled" (position) of a train according to the invention;

FIG. 6 illustrates the various steps of extraction of the pseudo-vertical elements in an image, as implemented in the device of the invention;

FIG. 7 illustrates the principle of interaction between a real scene and the image delivered by the view taking apparatus of the device of the invention;

FIGS. 8A to 8E present the different views from which are derived the geometrical models of a moving vehicle (FIGS. 8B-8E) and of a guideway (FIG. 8A);

FIGS. 9A to 9C present a geometrical model of a guideway switching system (FIGS. 9A-9B) and the simulation of the spatial evolution of a locomotive, reduced to a single segment, of constant length between the bogies, when passing through a curvature transition of a guideway modeled by its alignment axis (FIG. 9C);

FIGS. 10A to 10C show a flat geometrical pattern of the guideway, seen from above (FIG. 10A) and in perspective projection with its asymptotes (FIG. 10B), and a simulation of the movement of a locomotive (FIG. 10C);

FIGS. 11A to 11C illustrate the notion of a navigation corridor which is defined by the apparent motion in the image of the lower end of the two vertical elements closest to the view taking apparatus of the device of the invention.

6. DETAILED DESCRIPTION OF ONE EMBODIMENT OF THE INVENTION

Here below, we describe an embodiment of the invention wherein the moving vehicle, the speed and the position of which are measured by means of the device (sensor) of the invention, is a train travelling on a track consisting of two rails. Such a device can of course be implemented on other types of vehicles moving on a guideway.

In the following example, the device of the invention measures the speed and the position of a train from images of the scene situated in front of the train obtained by means of a view taking apparatus.

In one alternative, this speed can however be measured from images of the scene situated in the rear of the train.

6.1 Principle of the Invention

The device of the invention enables to measure the speed and the "distance travelled" of a train, by internal reference, in railway environment partially known a priori, through an embedded system of monocular vision. To this end, the device of the invention implements a processing of images coming from a same sequence, taken in a structured environment. It extracts from the image, in real time or almost in real time, the relevant primitives of the projection of the guideway (the visual scene), performs the tracking and computes the scrolling motion of these primitives in the image. The computation of the speed and of the "distance travelled" of the vehicle is finally made possible by a priori knowledge of some real quantities of the guideway (the real scene).

The device is placed on the instrument panel of the vehicle and a few parameters depending on the vehicle are entered before starting any estimate of the speed and position (the term conventionally used is "put, plug and play" device).

The use of the device of the invention in a moving vehicle significantly increases railway safety through the:
- improvement of the accuracy and reliability of the measurements of speed and position, and
- fast execution of simple and robust algorithms related not to specific models, that are difficult to obtain from manufacturers, but to models, the parameters of which are generic and stable.

The device of the invention complies perfectly with an environmental approach that reduces costs through substantial savings in the number of equipment, traditionally fitted on rails and required to compensate for drifts in measurements, delivered by the current onboard instruments, through regular readjustments.

6.2 Sensor for Measuring Speed and Position

Figure 1:
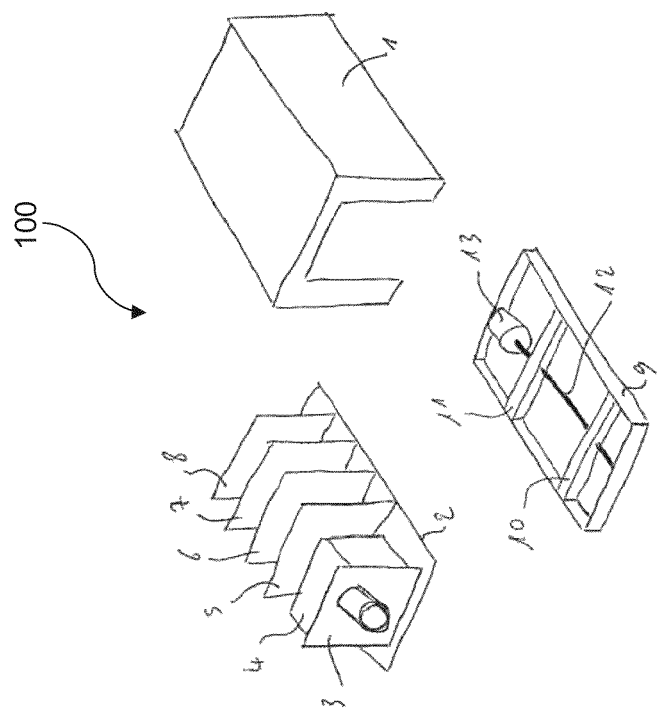
FIG. 1 is a schematic view in perspective of the device of the invention according to one embodiment.

As illustrated in FIG. 1, the sensor device 100 of the invention takes the form of a compact housing comprising a cover 1, a wear plate 2 and a removable auto-calibration device 9.

The cover 1 is provided on one side with a display unit, of the LCD type for example, enabling a driver to view the speed of the train as and when this speed is measured by the device of the invention.

The removable auto-calibration device 9 comprises two roughly parallel removable spacers 10 and 11 that are crossed by a rod or worm screw 12 driven by a motor 13.

On the wear plate 2 are respectively mounted an anti-vibration and anti-blooming camera 4 by means of a fixing plate 3, a pre-processing (filtering, labeling, etc.) board 5, a frame grabber 6, a computer 7 (for image processing) and an input/output (I/O) board that is ERTMS/ETCS compatible.

The sensor 100 is placed anywhere and in the most stable manner on the instrument panel facing the windshield of the driver's cab, and the camera 4 is pointed outwards, towards the railway track.

As discussed in more detail here below, the sensor 100 is intended for measuring the speed and the "distance travelled" by simple analysis of the trajectory of the vehicle and of the scrolling in the image of the objects located along the track.

Figure 2:
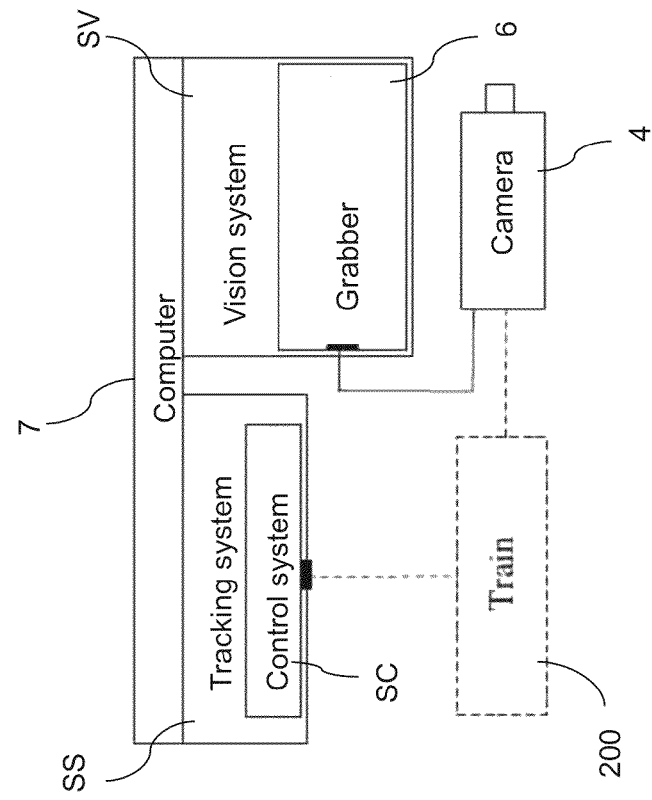
FIG. 2 is a functional diagram of the implementation of the device of the invention.

To this end, the flow chart illustrated in FIG. 2 sub-divides the sensor 100 into a vision system SV and a tracking system SS which, both connected to the computer 7, process information extracted from the images captured by the camera 4.

The vision system SV comprises a board 6 (or grabber) for the acquisition of images captured by the camera 4 which can be a CCD (charge-coupled device) camera for example. It is not ruled out that these images can be stored in a storage memory (not shown) connected to the computer 7, but the iterative method of the invention makes it necessary to keep only two successive images in memory, these images being called a "current image" and a "previous image", cleared of any irrelevant information.

The sensor 100 is made completely autonomous because it includes a tracking system SS capable of detecting and correcting any errors in tracking of the railway track and of the objects located along it, these errors being due to the voluntarily chosen simplicity of the models implemented in the estimate of speed and position of the train. In one alternative, the tracking system SS can partially or completely replace the driver by including a control system SC for the train 200.

In this example illustrated in FIG. 5, the computer 7 of the sensor 100 uses algorithms derived from generic models of the train-camera pair and of the railway environment, and also of dynamic elements of the track/train set such as data on the task to be performed (running on the railway track in this case). During operation, the computer 7 directly or indirectly receives information on the current state of the train 200 (proprioceptive information) and the railway track (exteroceptive information). The only parameters that differ are those characterizing the train 200 in particular, the camera 4 and the railway environment in which the train 200 is circulating.

Without proprioceptive sensors, the state of the train is estimated from the analysis of the scrolling movement, in the image, of the railway environment (railway track, poles along the track, etc.).

From these parameters stored in a storage memory and from the information on the current state of the train 200 and the railway environment provided by the vision system SV and, in one alternative, from the control system SC, the computer 7 processes the images, delivered by the camera 4 and the vision system SV, and determines the speed and the "distance travelled" of the train 200 by means of the tracking system SS.

The models (or representations), used in the estimate of speed and "distance travelled" according to the principle of the invention, and described in detail here below, require simplifying assumptions. These assumptions can be classified into two categories:
- a priori knowledge of the scene (constant elements): 1.435 m track gauge on a normal track in Belgium, verticality preferred owing to the gravity in a structured scene, constant number of images to be processed per second;
- expected behavior of the train (bounded elements): bends with high radii of curvature that are locally constant, locally flat railway track, low rolling and pitching motions of the train.

6.3 Geometrical Model of the Vehicle

The model of the vehicle is specific to the train in which the sensor device of the invention (FIGS. 8B to 8E) is located. The locomotive can be simply represented in the plane, according to a wire frame model, by a segment connecting the centre of rotation of its two bogies. Indeed, the locomotive is a vehicle guided by the running rails of the track, and its spatial configuration therefore depends on its position in the network. The steering angle of the vehicle relative to the tangent to the alignment curve of the track depends on the real distance between its bogies. Throughout the journey on the railway track, the bogies are, by assumption, always perpendicular to the tangent of the line of the rails. The centre of rotation of each of the two bogies, situated on the same longitudinal centerline of the locomotive, approximately follows, one after the other, the same alignment curve equidistant between the two rails of the track.

The camera is placed on the instrument panel of the driver's cab and pointed outwards, before the front bogie in the extension of the segment that models the locomotive. Its position and its direction are assumed not to change, or to change very little, in the reference frame linked to the locomotive.

The calibration operation, which is to find the process of forming the images taken by the camera, is performed by means of the pinhole model, which is the simplest and most commonly used in image processing.

The perspective projection of the 3D model of the railway track deforms it in such a way that its asymptotes converge in the image plane towards a single point known as a "vanishing point".

The extraction of this point makes it possible to find the behavior of the locomotive in real space.

In addition, the height of the camera depends on that of the locomotive and of the instrument panel. It is possible to partly overcome this dependence on a priori knowledge, especially the position of the camera in the locomotive cab, by providing for an automatic calibration of the camera by means of the auto-calibration device 9 (as seen in FIG. 1).

Some dimensional parameters or even behavioral parameters of the train shall nevertheless be entered in order to configure the system, such as for example the distance between the bogies and the maximum acceleration/deceleration of the train.

6.4 Geometric Model of the Camera

The camera is modeled on the basis of simplifying assumptions described as follows. The intrinsic parameters of the camera are constant. The angle of inclination a of the camera is small ($<10°$). The angle of horizontal deflection $\psi$ with respect to the main direction of the track is small ($<10°$). The angle of rotation $\theta$ of the camera relative to its axis of sight corresponds to the angle of the greatest number of pixels in the image, by calculating modified Deriche filtering, as described here below. The height z0 of the camera is constant.

6.5 Geometric Model of the Railway Track (FIG. 8A)

The guideway in the railway environment has characteristics enabling certain assumptions, especially on its infrastructure, owing to the speed of the trains. The railway track is locally flat and its curvature C is locally constant. The width, e, of the railway track is constant and known (it corresponds to the spacing between the two rails). The rails are continuous lines with a constant and known width L. The railway switch follows a track transition curve called a spiral strain curve (Cornu spiral or clothoid) in order to reduce the effects of centrifugal force that the passengers might suffer. The front view is that the horizontal and vertical edges are parallel to each other. The geometrical characteristics of the poles of a same series along the tracks are constant (spacing between two consecutive poles, distance from the track, width, height, shape).

6.6 Model of the Railway Environment

A priori knowledge of the scene in railway environment, for each country crossed, requires the entry of certain parameters, such as the track gauge, in order to configure the device of the invention.

6.7 Computation of the Speed and Distance Travelled by the Train by Recognition and Localization of Visual Cues As mentioned here above, the device of the invention implements a system of vision that includes a video camera, the perception mode of which would be more closer human model in terms of vision, balance, scene interpretation, analysis of motion in the image and decision making, but the operational limits of which would be defined by the technology existing in the market. The interpretation of the data, that the video camera delivers, is greatly simplified compared to approaches implementing one or more odometry sensors.

For images of scenes acquired in structured environment, in this case railway environment, the vertical straight lines, which are extracted therefrom, are frequent and constitute characteristics, the properties of which are preserved throughout a same sequence. In one particular mode of implementation, these vertical straight lines can be matched by a method based on the correlation for example (which, in a known way, enables a matching between the dots or areas of interest extracted from two successive images).

To be certain that a vertical element in the image truly corresponds to a vertical edge of an object in the scene, without knowing the angular position of the camera in a fixed absolute reference frame, the idea is to extract not the vertical straight lines from the image but those the direction of which is the most represented in the image and assimilated to the direction of gravity.

The device of the invention then uses a filter for detecting the direction most represented in the image, in the form of a modified Deriche filter, in which only the contours having the same directional gradient will be retained. Thus, some of the characteristics, or primitives, moving in the image, materialized in specific areas of interest, are straight-line segments extracted previously in a preferred direction, determined by a modified Deriche filter, the initial functions of which are the estimate of the gradient and the extraction of contours.

The modification of such a filter has made it possible not only to extract from the image the contours of vertical objects constituting the scene, but also to compute the angle of the greatest number of pixels in the image. The value of this angle is communicated to an image rotation system (hardware or software), in order to stabilize this angle, by derotation, and to provide to the device of the invention, hence to the train, its own internal reference based on the assumption of verticality.

In other words, the modified Deriche filter enables the extraction of the pixels, for which the gradient direction is the most encountered in the image, and uses this property to ensure the stability of the image against the rotational mechanical disturbances to the camera.

It must be noted that the extraction of relevant primitives implements a step of converting a grayscale image to a binary image (black and white), which contains only the contours. The complexity of the algorithms with respect to those dealing with raw images is greatly simplified.

In one alternative, the derotation phase, which straightens the image, by an angle computed from the modified Deriche filter, precedes the phase which, this time, directly extracts vertical contours of the image elements.

This approach is preferably implemented in the device of the invention in such a way that a vertical element in the visual scene (image) truly corresponds to a vertical element in the real scene (railway track).

Considering that this assumption to be established, then areas of interest materialize vertical straight lines from the contours preliminarily extracted from the image (FIG. 4). To this end, a phase of recognition and location shall follow the one of extraction in order to assign each retained dot to its respective straight line.

One method is to use a Prewitt convolution mask (with x gradient approximation) in order to highlight the vertical edges present in the image (FIG. 6). Such a convolution is followed by a thresholding operation, the threshold value being for example 20, and a binarization in which the retained dots have a gray level equal to 255.

The result obtained is a rough plot of the vertical components of the image of the scene and not only of the contours. An intermediate step is to keep only certain dots sorted by columns, of width equal to one pixel, in uninterrupted successions of more than 10 pixels. This intermediate step enables the elimination of the isolated dots and of the dots successions that are too short. These alignments of dots in turn gather, stick against each other, and finally get affiliated to structures of bounded width and height.

This spatial boundary is represented by a rectangle, the direction of which is vertical and the position of which is determined by the coordinates of its top left corner in the image. After distinguishing the vertical elements from each other, the localization program retains only those that meet the following criteria:

a sufficient height (h>10 pixels);

a tilt limit not to exceed (|d|< or equal to 2 pixels).

6.8 Detection of the Track Rails

The choice of the model of the guideway, the principle of the perspective projection of this guideway in the image, the contrast of continuous lines formed by the rails in the image, and finally the real-time constraint on the application itself of the invention, enable that the best and quickest method for detecting rails to use, as processing regions, not polygonal areas of interest, as is the case for the extraction of vertical features seen here above, but simple horizontal lines, the number and disposition of which in the image are defined and adjusted at each iteration, based on certain criteria, such as the measured speed of the train, the quality image information (entropy), the difference in height between the vanishing point of the railway track and the horizon line in the image, the measured curvature of the railway track, etc.

This method of signal processing is quite adequate for the purpose of fast detection, as compared to more conventional methods, given the very small amount of pixels to be processed. It is based on the principle that, in a same sequence of images in a railway context, the statistical dispersion in the grey level of the track (standard deviation) is assumed to be the same in proximity to and on either side of the rails on all the horizontal detection lines.

It is enough then to determine the standard deviation of the distribution function in gray level on the most representative detection line (the closest to the camera, i.e. the lowest in the image). Then, in each of the horizontal detection lines, the distribution function is smoothed by Gaussian filtering and reduced to the only dots the value of which exceeds a certain adaptive threshold, defined by the average of the distribution function to which is added the previously computed standard deviation value.

This technique, which is known in the image processing context, makes it possible simply and reliably to overcome illumination changes that may occur in a same image.

The gradient of the resulting distribution function then determines the left and right edges of the trace of each rail of the track.

In one alternative, it is entirely possible to spatially limit the distribution function in gray level near the railway track, such that the horizontal detection line is reduced to a single segment. It is also possible to assign a different detection segment to each rail, per horizontal detection line, in case that the image quality is degraded resulting in a partial loss of information, for example.

6.9 Optical Flow

At each image acquisition, the useful visual cues are recognized and located, then matched with their counterpart of the previous image in a same sequence, in order to estimate their apparent motion in the image, or optical flow.

The optical flow, i.e. the instantaneous speed field of the gray levels in the image (or motion field) is a 2D representation of a 3D motion. To each dot of this representation is assigned a speed vector corresponding to a direction of motion, a speed of motion and a depth.

Instead of computing the optical flow by the temporal changes in the intensity of the image, it is possible to consider also the temporal changes of values that are the result of various local operators, such as contrast, entropy, the average and the spatial derivatives of the image intensity. In each case, a relatively dense optical flow is estimated, thereby determining the motion field, at each pixel of the image if necessary. However, the optical flow never corresponds to a true motion field as the illumination changes, its main source of error, are reflected in the computation.

The optical flow is then used jointly with additional constraints, or information on the scene, in order to determine the 3D motion parameters of the objects in the scene.

6.10 Linear Model of Perspective Projection of the Railway Track

In the relationship of duality existing between the real scene and the image (visual scene), the association of locomotive-camera models (FIG. 7) makes it possible to determine the coordinates of the projection center and of the center of the image plane in the absolute reference frame. The coordinates of the projection, in the image plane, of any point of the scene linked to the camera, are expressed in the absolute reference frame and then in the reference frame linked to the camera.

The difficulty lies in the modeling of the scene and the expression of the interaction matrix, which is the relationship between the visual information changes in the image and the camera motions in real space.

In general, the adopted modeling uses a very simple formalism that implements only the dynamic parameters of the track/vehicle set varying linearly in the space of the image plane.

The tracking by Kalman filtering of the parameters, characterizing the simplified projection of the left and right rails, enables the simultaneous estimation of the scrolling speed of the relevant objects situated along the railway track.

The speed and "distance travelled" of the train are finally calculated by inverse perspective projection which enables the 3D reconstruction of a simplified railway track model, taking into account a priori knowledge of the real values of certain characteristic geometrical quantities of the track/vehicle set, specific to the country and to the vehicle (track gauge and length of the vehicle).

Given these assumptions, the parameters candidates for modeling the linear variation of the track-vehicle set are for example:

C: local curvature of the railway track;

ψ: angle of horizontal deflection of the optical axis relative to the main direction of the railway track;

x0: abscissa of the projection center of the camera relative to the curve of alignment of the railway track.

These parameters, as well as the speed and "distance travelled" of the train, are computed and updated very simply for each rail detection operation in the image.

6.11 Railway Track Tracking Algorithm a) Motion Control Based on Visual Information For a given itinerary, a moving train moves in one direction defined by the switching of the railway rails, while its speed and acceleration are controlled by the driver, who is in charge of the maneuver with help from the ETCS for the safety part of the operation (emergency braking).

According to the invention, the motion control of the vision system embedded in the locomotive is achieved by adapting a visual servo control algorithm in a structured environment.

Between two consecutive image acquisitions by the camera, as in the case of measurements by sensors traditionally used in a railway context, the vehicle moves blindly from a point to another one (this is the "look-and-move" structure). On the other hand, the external inputs (or references) of the visual servo control system are no longer expressed in the form of situations between the sensor (in this case the camera) and the scene, as is the case for scene analysis algorithms in which the position, the speed and the acceleration are some notions of situations represented in an absolute reference frame. Instead there are expressed in the form of one reference visual situation (visual motif) to be reached in the image. In this type of algorithm used by the invention, the visual information selected to constitute this motif shall reach the values that correspond to a successful execution of the task assigned to the vehicle.

This formalism contains tracking loops that use visual information, coming from the simplest existing image features (dots, straight line segments). This approach makes it possible to completely avoid the need for the interpretation phase (i.e. the reconstruction phase of the 3D model of the scene), and to considerably reduce the computation time because the information, extracted from the image, is directly used in the tracking loop. This also eliminates situation estimate errors and complex computations. This approach uses the characteristics (geometry, topology) of certain regions of the scene which remain essentially stable throughout the progress of the vehicle.

The constraint of permanently, having a reliable and available measurement of speed and "distance travelled" of the moving train, requires the implementation of a system of tracking and prediction, by Kalman filtering, of a set of notions, such as areas of interest and some geometrical characteristics of the railway track (radius of curvature, track gauge, alignment), the behavior of which is known a priori through models and the previous estimation of which is still in memory.

b) Tracking of the Railway Track

Figure 3:
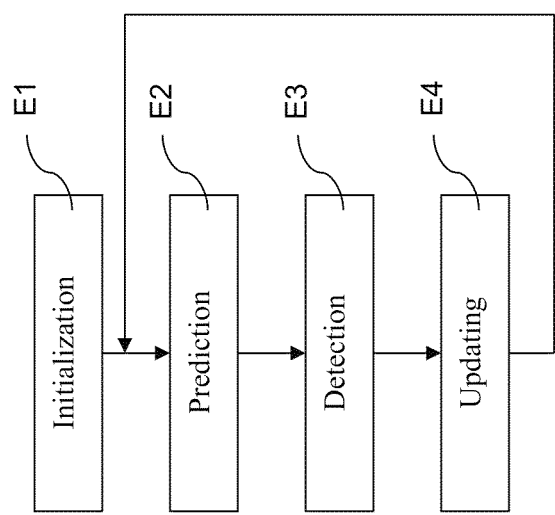
FIG. 3 illustrates the various steps of the tracking algorithm implemented in the device of the invention.

The approach, based on the principle of FIG. 3, thus comprises a step E1 for initializing the model, a step E2 for predicting the position of the detection zones by the model, a step E3 for detecting the rail in each of the zones and a step E4 for updating the parameters of the model based on the position of the detected pieces of rail.

The initialization step (E1) enables to set a priori the parameters of the model.

The prediction step (E2) makes it possible to position the areas of interest of the image in which will be detected the rails and the objects along the railway track. This is done through the model of the track/vehicle set computed at the previous iteration.

By knowing the curvature of the railway track, it is easy to predict the position of the rails and the objects in the image. By fixing a sufficiently large search zone around this position, taking into account the errors of modeling, due to the approximations, and of speed, computed at the previous iteration, it is possible to detect the presence of the rail and the one of an object.

The search in the area of interest of the image (i.e. a portion of the image) for one or more visual cues, representing at least one geometrical characteristic of the guideway and/or at least one object situated along the guideway, simplifies the processing operation.

It is the detection step (E3) that enables the location of the rails and of the objects in the predicted zones. The rails can be detected by classic methods, into polygonally or linearly shaped areas of interest or into the entire image, by extraction of their contours (contour segmentation) or of the structure of the railway track (region segmentation, based on the texture criterion), then by comparison with a 2D railway track model.

Because of the specific nature of the rails to be detected (continuous, sufficiently contrasted and covering more than half of the image), the real-time application requires the choice to make detections from simple horizontal lines spaced out in the image. One method is to use a small number of detection rows selected based on the measured speed.

The updating of the model parameters (E4) is done, from the previous measurements, by Kalman filtering (least squares minimization).

In other words, the device of the invention favors simple models, that are very fast in execution and compensates for modeling errors through a system of tracking and prediction, in the image, by Kalman filtering (a Kalman filter enables the tracking and prediction of a set of notions extracted from the image, based on the contours of the objects). The Kalman filter has two distinct phases, namely a prediction phase (E2) and an updating phase (E4). The prediction phase uses the state estimated at the previous time to produce an estimate of the current state. In the updating phase, the observations at the current time are used to correct the predicted state in order to obtain a more accurate estimate.

6.12 Apparent Motion in the Image (Navigation Corridor)

The infrastructure situated on either side of the rails, along the track on which is travelling the locomotive, is represented by vertical elements (FIG. 11A). A navigation corridor is defined by the apparent motion in the image of the lower end of the two vertical elements closest to the camera (FIG. 11B).

In the case of railways, the navigation corridor is the direct result of the pre-existing model of the track and is projected onto the image plane of the camera onboard the locomotive in motion.

The interpretation of the information provided by the two motion vectors in the image is a problem when these vectors have a slope of a same sign. Indeed, in this case, a brief analysis does not make it possible to accurately determine that the two vectors represent well the apparent motion of objects (poles) belonging to opposite sides of the track. That is why, in case of ambiguity (FIG. 11C), it is preferable to consider only the vertical element closest to the camera in order to represent the navigation corridor.

6.13 Other Aspects and Variants

In one embodiment of the invention, the device of the invention implements a module for displaying one or more elements that structure the environment, in which the vehicle is moving, and that were used to compute the speed and "distance travelled" of the vehicle moving on a guideway.

This display module is, for example, an LCD screen that is particularly suitable for monitoring the environment.

In one variant, the image of the set of virtual objects can be projected on or incrusted in the windshield of the vehicle or in a transparent mirror situated in front of the windshield (this is called head-up display or head-up viewer) so as to constitute a driving aid in particular conditions of visibility, speed, network congestion etc.

In other words, the display module displays relevant elements directly extracted from the scene as well as additional elements coming from processing operations on the relevant elements, and constitutes for example a driving aid (i.e. it enables the driver to take decisions). These additional elements provide the driver with the information on the moving environment. This information can be geometrical such as, for example, straight lines and curves linking two different objects in the image, and/or numerical as, for example, data such as the value of the speed and/or the position of the vehicle (these elements can optionally be displayed when the driver presses a button), and/or information of any other type.

It must be noted that the principle of the invention does not apply solely to vehicles running on a guideway but more generally to vehicles moving along a guideway (magnetic levitation trains for example).

Besides, the principle of the invention described in the above embodiment can also be applied when the capturing apparatus is not a view taking apparatus, but a thermal camera, a magnetic camera or a camera of any other type.

It must be noted that the principle of visual information processing by the device of the invention, as described here above, can be implemented in order to measure the speed and the distance travelled by a mobile vehicle moving on a guideway, but also in order to position a mobile vehicle at any time on any road, rail or water transport network, insofar as this network is structured and known a priori in the form of maps, and contains any types of in-situ pieces of information about location and direction (markers, boards, etc.).

In one particular implementation, this application of the device of the invention makes it possible navigation on a planned route, the successive crossing points of which define respective local reference systems (or relative reference systems) in which the vehicle moves and is located. Once a crossing point "k" is crossed, a new crossing point "k+1" takes over and constitutes the new target to be reached.

This positioning solution is an alternative to the GPS system which has numerous drawbacks. Indeed, the positioning computation by means of the GPS system depends continuously on the quality of reception of satellite signals, which may be interrupted or disturbed for external reasons of poor reception (tunnels, corridors, relief features, undesired signals, storms, high humidity, etc.), by deliberate or involuntary radio interference, by operation during which the reception is temporarily masked, by the momentary alignment of several satellites preventing accurate computations (temporary geometrical uncertainties), or by an incident in a satellite.

Advantageously, this particular application of the device of the invention is an autonomous system for planning routes and for navigation in a structured transport network known and mapped a priori. This system computes the location of the vehicle according to the same hardware and software principles as the device of the invention, as described above, with respect to physical characteristics and identifiers which, in addition to their position in the transportation network, contain pieces of information about the direction to take, the topology of the covered areas, or the behavior to be adopted (direction of turns, speed limits, traffic lights).

This application is based on the language adopted by motor racing co-pilots, using maps known a priori for a given route. Its implementation may comprise a service for updating transportation network maps, and a service formapped planning and routing, including real-time information on traffic.

This application preferably implements a display module, as described here above, and a sound signal providing the user with pieces of information about a direction to follow or a speed not to exceed, for example.

An exemplary embodiment of the invention overcomes drawbacks of the prior art.

An embodiment proposes an accurate and reliable method for measuring the speed of vehicles moving on a guideway, and if necessary, their position without requiring the implantation on their journey of specific devices, such as beacons.

An embodiment also provides a device for implementing this method, which is as inexpensive as possible, which can be installed in any type of vehicle and which can operate correctly regardless of environmental conditions.

An embodiment of the invention provides a solution for measuring the speed and position of vehicles moving on a guideway, which meets the interoperability and safety requirements of the ERTMS system in particular.

Although the present disclosure has been described with reference to one or more examples, workers skilled in the art will recognize that changes may be made in form and detail without departing from the scope of the disclosure and/or the appended claims.

The invention claimed is:

1. A device for measuring the speed and/or position of a vehicle moving along a guideway, by day and by night, in doing so irrespective of the climatic conditions, wherein the device comprises:
   at least one image capturing apparatus delivering a sequence of digital images of an environment of said vehicle;
   means for determining apparent motion of at least one visual cue, called a primitive, between two images delivered by said image capturing apparatus, in order to determine the apparent motion of said at least one visual cue, implementing:
      means for simplifying said images by using at least one model of said environment, enabling detection of said at least one visual cue in the simplified images;
      means for predicting an image zone in which said visual cue will be situated in a following image;
      means for extracting one of said visual cues in said image zone;
      means for estimating a movement, by comparing an actual position of said visual cue in a current image and in a previous image;
   means for estimating the speed and/or the position of said vehicle based on said apparent motion of said at least one visual cue.

2. The device according to claim 1, wherein said at least one image capturing apparatus belongs to the group consisting of:
   view taking apparatuses;
   thermal cameras;
   magnetic cameras.

3. The device according to claim 1, wherein said at least one visual cue is representative of at least one geometrical characteristic of said guideway.

4. The device according to claim 1, wherein said at least one visual cue is representative of at least one geometrical characteristic of at least one object situated along the guideway.

5. The device according to claim 1, wherein the device implements a model of said vehicle and a model of said image capturing apparatus.

6. The device according to claim 1, wherein the means for tracking and prediction implement a Kalman filter.

7. The device according to claim 1, wherein the device comprises a tilt sensor configured to generate a signal representative of inclination of said image capturing apparatus and means for rotating an image delivered by said image capturing apparatus at an angle that depends on said signal generated.

8. The device according to claim 7, wherein said tilt sensor implements a Deriche filter.

9. The device according to claim 1, wherein the device implements an interaction matrix linking the motions of the image capturing apparatus in the real space with the motions of said at least one cue in said images.

10. The device according to claim 1, wherein the device comprises means for calibrating said image capturing apparatus.

11. The device according to claim 1, wherein the device comprises means for displaying digital images of said environment delivered by said image capturing apparatus.

12. The device according to claim 11, wherein said images are displayed on at least one LCD screen, on a windshield of said vehicle or on a transparent mirror situated before the windshield of said vehicle.

13. The device according to claim 1, wherein the device comprises means for inputting a given route.

14. The device according to claim 13, wherein the device comprises means for storing at least one map of a transportation network.

15. The device according to claim 13, wherein the device comprises means for indicating a geographic position of said vehicle.

16. A method for measuring speed and/or position of a vehicle moving along a guideway, by day and by night, irrespective of the climatic conditions, wherein the method comprises the following steps:
obtaining a sequence of digital images of an environment of said vehicle by using an image capturing apparatus;
determining apparent motion of at least one visual cue, called a primitive, between two images delivered by said image capturing apparatus, in order to determine the apparent motion of said at least one visual cue comprising the following steps:
simplifying said images by using at least one model of said environment, enabling detection of said at least one visual cue in the simplified images;
predicting an image zone in which said visual cue will be in a following image;
extracting one of said visual cues in said image zone; and
estimating a movement by comparing an actual position of said visual cue in a current image and a previous image; and
estimating speed and/or position of said vehicle from said apparent motion of said at least one visual cue.

17. A non-transitory computer-readable medium comprising a computer program product stored thereon and executable by a microprocessor, wherein the computer program product comprises program code instructions for execution of a method for measuring speed and/or position of a vehicle moving along a guideway, wherein the method comprises the following steps:
obtaining a sequence of digital images of an environment of said vehicle by using an image capturing apparatus;
using the microprocessor to determine apparent motion of at least one visual cue, called a primitive, between two images delivered by said image capturing apparatus, in order to determine the apparent motion of said at least one visual cue comprising the following steps:
simplifying said images by using at least one model of said environment, enabling detection of said at least one visual cue in the simplified images;
predicting an image zone in which said visual cue will be in a following image;
extracting one of said visual cues in said image zone; and
estimating a movement by comparing an actual position of said visual cue in a current image and a previous image; and
estimating speed and/or position of said vehicle with the microprocessor from said apparent motion of said at least one visual cue.

18. The device according to claim 3, wherein said at least one geometrical characteristic of said guideway includes at least one of, a radius of curvature of the guideway, a track gauge of the guideway, an alignment of the guideway.

19. The device according to claim 4, wherein said at least one geometrical characteristic of at least one object situated along the guideway comprises verticality of poles along said guideway.

* * * * *